July 30, 1935.   B. D. BEDFORD   2,009,833
ELECTRIC POWER CONVERTING APPARATUS
Original Filed Aug. 27, 1930

Fig. 1.

Fig. 2.

Inventor:
Burnice D. Bedford,
by Charles E. Tuller
His Attorney.

Patented July 30, 1935

2,009,833

UNITED STATES PATENT OFFICE 2,009,833

ELECTRIC POWER CONVERTING APPARATUS

Burnice D. Bedford, Schenectady, N. Y., assignor to General Electric Company, a corporation of New York Application August 27, 1930, Serial No. 478,164
Renewed March 26, 1935

6 Claims. (Cl. 175—363)

My invention relates to electric power converting apparatus and more particularly to such converting apparatus for transmitting power from a direct current system to an alternating current system by the use of electric valves.

My invention constitutes an improvement upon that described in a copending application of Camil A. Sabbah, filed August 27, 1930, Serial No. 478,168, and assigned to the same assignee as the present application. This copending application relates to a type of apparatus for transmitting power from a direct current to an alternating current circuit, generally known in the art as a parallel type inverter. According to the invention disclosed in that application the characteristics of the parallel type inverter are improved by inserting a capacitance in series with the load circuit. I have found that the stability of the system over wide ranges in load may be substantially increased by so connecting the capacitance that it will carry not only the equivalent of the load current but the magnetizing current of the inductive device which serves to transmit current between the direct and alternating current circuits. I have also found that the operating characteristic of such a circuit may be improved by including a portion of the reactance, which it is customary to put in series with the direct current line, in the circuit which includes the capacitance.

It is an object of my invention, therefore, to improve the operating characteristics of electric power converting apparatus of the type generally known in the art as a parallel inverter.

Other and further objects of my invention together with a more complete understanding thereof may be had from the following description taken in connection with the accompanying drawing and its scope will be pointed out in the appended claims.

In carrying my invention into effect I make use of the well known parallel type inverter comprising two electric valves connected in parallel across a source of direct current through an inductive winding such as a reactor or transformer provided with an electrical mid point tap which is connected to one of the direct current terminals. The circuit is provided with the usual commutating condenser connected across the reactor terminals and with a grid control circuit as will be well understood by those skilled in the art. A load circuit is associated with the reactor or transformer. According to my invention I provide a circuit inductively associated with each of the valve circuits and, therefore, adapted to carry not only the equivalent of the load current but the magnetizing current of the transformer or reactor and I include in this circuit a capacitance adapted to carry the equivalent of the full load current and, if desired, a portion of the reactance which is normally placed in the direct current line.

In the drawing, Fig. 1 is a diagrammatic representation of my invention as applied to a parallel type inverter, while Fig. 2 shows a portion of an inverter circuit with a modification of my invention applied thereto.

Referring now to Fig. 1 of the drawing, I have shown a parallel type inverter comprising electric valves 14 and 15 each provided with an anode, a cathode and a control grid. The anodes of these valves are connected to opposite terminals of a reactor 12, the electrical mid point of which is connected to the positive direct current terminal 10 through a smoothing reactor 13. The cathodes of the valves 14 and 15 are connected together and to the negative direct current terminal 10. A capacitor 16 is connected between the circuits of the valves 14 and 15 to commutate the currents between them. The control circuit for the grids of the valves 14 and 15 is shown as including the secondary winding of a transformer 23, the primary winding of which is energized with an alternating potential of any desired frequency. The mid point of the secondary winding is connected to the cathode circuit of the discharge devices 14 and 15 through a negative bias battery 24 as is well understood by those skilled in the art.

The electric valves 14 and 15 may be of any of the several types well known in the art, but I prefer to use vapor electric discharge devices in which the starting of the current through the device is controlled by the potential of the control grid, but in which current through the device may be interrupted only by reducing the anode potential below its critical value.

I have illustrated an alternating current load device 17 connected across the terminals of the reactor 12. However, it will be obvious to those skilled in the art that the reactor 12 may be replaced by the primary winding of a transformer and that the load device 17 may be connected to the secondary winding of this transformer. A series transformer 18 is provided, having the primary windings 19 and 20 connected in the circuits of the electric valves 14 and 15 respectively. The transformer 18 is provided with a secondary winding 21 across the terminals of which is connected a capacitor 22. With this arrangement it will be seen that any current flowing in the circuit of either of the electric valves 14 or 15 is transmitted through the series transformer 18 to the circuit of the capacitor 22. By this arrangement it is also possible to step up the potential applied to the capacitor 22 so that a smaller capacitor may be used.

In explaining the operation of the above described arrangement it will be assumed that the polarity of the potential applied to the grid of the electric valve 14 is such as to render it conducting. Current will then flow from the positive direct current terminal 10 through the left-hand portion of reactor 12 and through the valve 14 to the negative direct current line. As the current builds up in the left hand portion of the reactor, this reactor acts as an auto-transformer and a still higher positive voltage is induced in the right-hand portion of the reactor. The capacitor 16 is thus charged to twice the potential of the direct current circuit. As soon as the grid potential changes polarity so as to render the device 15 conducting, the full potential of the capacitor 16 is impressed between the anode and cathode of the valve 14 through the valve 15. As stated above, this potential is about twice that of the direct current supply and is much greater than the potential drop across the conducting valve 14. Since this potential of the capacitor 16 is opposed to the potential impressed on the valve 14 from the direct current supply it immediately neutralizes the impressed potential and interrupts the flow of current in the valve. Before the capacitor 16 is completely discharged the grid of the valve 14 becomes negative and prevents the restarting of the current in this valve. When the grid potential again reverses polarity the current is transferred from the valve 15 to the valve 14 in the same manner and this cycle is repeated indefinitely. It will be seen that in successive half cycles the current flows in opposite directions in the reactor 12 so that an alternating potential appears at its terminal which is applied directly to the load device 17 of the alternating current circuit.

By means of the series transformer 18 the equivalent of the current in the circuit of the electric valves 14 and 15, which includes not only the load current of the device 17, but also the magnetizing current of the reactor 12, is transmitted to the circuit of the capacitor 22. As pointed out in the above mentioned application, Serial No. 478,168, it has been found that the addition of a capacitor in the load circuit decidedly improves the load-voltage characteristic of the circuit at heavy loads. As stated in that application, the capacitor has an ohmic impedance which is preferably small relative to the load impedance at light loads and of the same order of magnitude as the load impedance at normal load or predetermined overloads. The short circuit current is also determined by the impedance of this capacitator. I have found that by inserting this capacitance in the circuit of the transformer 18 subject to the influence of the magnetizing current of the reactor 12, the load-voltage characteristic and stability of the circuit is materially improved, particularly at heavy loads.

Inasmuch as the current flowing in the circuit 21, 22 is the equivalent of the current in the circuit of the electric valves 14 and 15, the load current of the device 17, and also the magnetizing current of the reactor 12, the voltage developed across the capacitor 22 is analogous to the voltage which would be developed across the capacitor connected in series with the circuit comprising the elements 12, 17, 19 and 20 if the turn ratio between the windings 19, 20 and 21, is unity. The voltage induced in the circuit 21, 22 during the period when one of the valves is conductive increases to a certain point where the voltage in this circuit induces a counter-electromotive force in the primary windings of the transformer which voltage operates as a commutating voltage at the higher loads. Thus, the effect of the series capacitor 22 connected to the winding 21 of the transformer 18 is such that the converter system has, at the higher load values, a load voltage characteristic which is analogous to the load voltage characteristic of the series type converter. The system has, at light load, all the advantageous characteristics of a parallel type inverter and at the heavier loads, the advantageous characteristics of a series type inverter.

In the modification shown in Fig. 2 a large part of the reactance 13 normally in circuit with the direct current line has been included in the circuit of the secondary winding 21 of the transformer 18 in series with the capacitor 22. This is represented by the reactance 25. With this arrangement, saturation of the reactance 25 by any direct current component is prevented, thus permitting the use of a much smaller reactance.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a system for converting direct current energy into periodically varying current, the combination of a pair of direct current terminals, an inductive winding an intermediate point of which is connected to one of said terminals, a pair of electric valves connected respectively between opposite terminals of said inductive winding and the other direct current terminal, means for alternately rendering said valves conducting, an output circuit associated with said inductive winding, and a capacitance in series inductive relation with said valve circuits and connected to carry the equivalent of the output current of the apparatus and the magnetizing current of said inductive winding.

2. In a system for converting direct current energy into alternating current, the combination of a pair of direct current terminals, an inductive winding an intermediate point of which is connected to one of said terminals, a pair of electric valves connected respectively between opposite terminals of said inductive winding and the other direct current terminal, means for alternately rendering said valves conducting, an output circuit associated with said inductive winding, and a circuit including a capacitance inductively connected to both of said valve circuits so as to carry the equivalent of the magnetizing current of said inductive winding and the load current of the apparatus.

3. In a system for converting direct current energy into alternating current, the combination of a pair of direct current terminals, an inductive winding an intermediate point of which is connected to one of said terminals, a pair of electric valves connected respectively between opposite terminals of said inductive winding and the other direct current terminal, means for alternately rendering said valves conducting, an output circuit associated with said inductive winding, and a circuit including a capacitance serially and inductively associated with both of said valve circuits.

4. In a system for converting direct current energy into alternating current, the combination of a pair of direct current terminals, an inductive winding an intermediate point of which is connected to one of said terminals, a pair of electric valves connected respectively between opposite terminals of said inductive winding and the other direct current terminal, means for alternately rendering said valves conducting, an output circuit associated with said winding, a transformer having a primary winding serially connected in each of said valve circuits, said transformer having a secondary winding, and a capacitance connected in circuit with said secondary winding.

5. In a system for converting direct current energy into alternating current, the combination of a pair of direct current terminals, an inductive winding, an intermediate point of which is connected to one of said terminals, a pair of electric valves connected respectively between opposite terminals of said inductive winding and the other direct current terminal, means for alternately rendering said valves conducting, an output circuit associated with said inductive winding, a transformer having a primary winding serially connected in each of said valve circuits, said transformer having a secondary winding, and a capacitance and a reactor in circuit with said secondary winding.

6. In a system for converting direct current energy into periodically varying current, the combination of a direct current supply circuit, a load circuit, an inductive winding, a plurality of electric valves interconnecting said circuits through said inductive winding, means for alternately rendering said valves conducting, and a capacitance in series circuit relationship with the load current and the magnetizing current of said inductive winding to improve the load voltage characteristic of the system.

BURNICE D. BEDFORD.